United States Patent [19]

Itoh et al.

[11] Patent Number: 4,869,857

[45] Date of Patent: Sep. 26, 1989

[54] PROCESS FOR PRODUCING POROUS MEMBRANES

[75] Inventors: Hajime Itoh, Hiroshima; Hiroshi Takahashi, Otake; Kouji Ohbori, Otake; Hideaki Habara, Otake, all of Japan

[73] Assignee: Itsubishi Rayon Co., Ltd., Tokyo, Japan

[21] Appl. No.: 55,049

[22] Filed: May 28, 1987

[30] Foreign Application Priority Data

May 30, 1986 [JP] Japan .................. 61-126544
Dec. 23, 1986 [JP] Japan .................. 61-306869

[51] Int. Cl.⁴ ............................... C08J 9/28
[52] U.S. Cl. .................. 264/41; 210/500.35; 210/500.36; 210/500.42; 264/83; 264/500; 264/DIG. 13
[58] Field of Search ............. 264/41, 54, 83, 500, 264/DIG. 13; 210/500.35, 500.36, 500.42

[56] References Cited

U.S. PATENT DOCUMENTS

| | | | |
|---|---|---|---|
| 2,783,894 | 3/1957 | Lovell et al. | 264/41 X |
| 2,850,467 | 9/1958 | Livingood | 264/54 |
| 2,926,104 | 2/1960 | Goetz | 264/41 X |
| 2,983,960 | 5/1961 | Jilge | 264/94 X |
| 4,025,685 | 5/1977 | Haren et al. | 264/49 X |
| 4,177,228 | 12/1979 | Pröiss | 264/49 X |
| 4,212,839 | 7/1980 | Funahashi | 264/49 X |
| 4,226,886 | 10/1980 | Lakes | 264/49 X |

FOREIGN PATENT DOCUMENTS

| | | |
|---|---|---|
| 0147570 | 7/1985 | European Pat. Off. . |
| 1060357 | 7/1959 | Fed. Rep. of Germany . |
| 2743673 | 3/1978 | Fed. Rep. of Germany . |
| 2073530 | 10/1971 | France . |
| 2090310 | 1/1972 | France . |
| 2139087 | 1/1973 | France . |
| 993037 | 5/1965 | United Kingdom . |

OTHER PUBLICATIONS

Patent Abstracts of Japan, vol. 9, no. 237, (C-305), [1960], Sep. 24th, 1985; & JP-A-60 97 001, (Teijin K.K.), 30-05-1985, *Whole Abstract*.

Primary Examiner—Philip Anderson
Attorney, Agent, or Firm—Oblon, Fisher, Spivak, McClelland & Maier

[57] ABSTRACT

Porous membranes are produced by dissolving a film-forming polymer in a good solvent for the polymer, forming a film of the resulting polymer solution, and forcibly contacting saturated steam or mist-containing steam with at least one surface of said film. Such porous membranes have pores having a narrow pore diameter distribution and extending in a direction substantially perpendicular to the membrane surface at a high surface pore density on at least one surface thereof.

4 Claims, 4 Drawing Sheets

PROCESS FOR PRODUCING POROUS MEMBRANES

BACKGROUND OF THE INVENTION

1) Field of the Invention

This invention relates to a process for producing porous membranes which are useful, for example, in the filtration of fluids to remove any fine particles present therein.

2) Description of the Prior Art

Porous membranes are being utilized as filtering membranes and separating membranes in various fields of industry, and there is a continuing demand for porous membranes having a narrow pore diameter distribution in order to improve their performance characteristics in the removal and fractionation of fine particles present in fluids. In order to meet this demand, porous membranes of the straight pore type are now available. These porous membranes are made by bonbarding a polymer film of polycarbonate or the like with charged particles to form cylindrical pores extending in the direction of the film thickness.

Also known is a wet coagulation process for producing porous membranes from a polymer solution.

However, in the process for producing porous membranes by bombardment with charged particles, it is difficult to enhance the surface pore density of the porous membrane. In fact, conventional porous membranes produced by this process have a surface pore density of not greater than about 20%. Accordingly, these porous membranes have the disadvantage that such a low surface pore density fails to give a satisfactorily high fluid permeability per unit area of membrane.

Moreover, this process involves the use of a nuclear reactor for the generation of charged particles. The need for such a large-scale apparatus is another disadvantage of this process.

In the wet coagulation process using a coagulation bath, a nonporous skin layer tends to be formed on the surface of the porous membrane, thus making it difficult to enhance its permeability to fluids. Moreover, the use of a coagulation bath has the disadvantages of increasing the size of the apparatus, requiring the adjustment of its concentration, and raising the cost of recovery of the solvent.

SUMMARY OF THE INVENTION

It is an object of the present invention to provide a process for producing porous membranes which can be carried out with great ease and at low cost.

The process provided by the present invention makes it possible to produce porous membranes in which pores extending in a direction substantially perpendicular to the membrane surface (hereinafter referred to as "straight pores") are present at high surface pore density and also to produce porous membranes which, though having no straight pores, are devoid of a nonporous layer.

According to one feature of the present invention, there is provided a process for producing porous membranes which comprises the steps of dissolving a film-forming polymer in a good solvent for said polymer, forming a film of the resulting polymer solution, and forcibly contacting saturated steam or mist-containing steam with at least one surface of said film.

According to another feature of the present invention, there is provided a process for producing porous membranes which comprises the steps of dissolving a film-forming polymer in a good solvent for said polymer, forming a film of the resulting polymer solution on a moving support body, and forcibly contacting saturated steam or mist-containing steam with the surface of said film.

DETAILED DESCRIPTION OF THE PREFERRED EMBODIMENTS

The term "film-forming polymer" as used herein comprehends polymers which are soluble in organic solvents and insoluble in water and which can provide a castable solution. Examples of such polymers include fluorine-containing polymers (such as polyvinylidene fluoride, polytetrafluoroethylene copolymers and trifluoroethylene), polysulfones, polyethersulfones, polycarbonates, polyetherimides, polyethylene terephthalate, poly(meth)acrylic esters (such as polymethyl methacrylate and polybutyl (meth)acrylate, polyacrylonitrile, cellulose esters (such as cellulose acetate, cellulose nitrate), polyolefins (such as polyethylene, poly-4-methyl-1-pentene and polybutadiene), polyvinyl acetate, polystyrene, poly-α-methylstyrene, poly-4-vinylpyridine, polyvinylpyrrolidone, polyvinyl chloride, polyvinylidene chloride, silicon polymers and polyphenylene oxides, as well as copolymers of the foregoing. Among them, polymers suitable for the intended purpose may be selected and used with due consideration for their thermal resistance, chemical resistance and other properties.

In the practice of the present invention, the above-enumerated polymers (including copolymers) may not only be used alone, but also be used in the form of a blend consisting of two or more polymers having mutual compatibility. Such blends have the advantage that, since the polymer components of a blend usually have different solubilities in a particular solvent, the structure of the resulting porous membrane can be elaborately controlled by utilizing this property. Examples of such blends include polymer alloys consisting of a vinylidene fluoride-tetrafluoroethylene copolymer/a polyalkyl (meth)acrylate, polyvinyl chloride/a polyalkyl (meth)acrylate, polystyrene/polybutadiene and a styrene-acrylonitrile copolymer/polyphenylene oxide.

In the practice of the present invention, the good solvent for the polymer may be any solvent that can dissolve the above-defined film-forming polymer. However, if attention is paid to the miscibility of the solvent and water, a porous membrane having good straight pores can be efficiently produced by using, as the good solvent, a solvent having a solubility of not greater than about 50 g per 100 g of water at 20° C. The good solvent should have a solubility of greater than about 0.5 g per 100 g of water and preferably about 5 g per 100 g of water at 20° C.

Examples of such solvents include ketones such as methyl ethyl ketone, diethyl ketone, methyl n-propyl ketone and methyl isobutyl ketone; acetic esters such as methyl acetate and ethyl acetate; formic esters such as methyl formate and ethyl formate; acrylic esters such as methyl acrylate; aromatic alcohols such as benzyl alcohol, phenol and cresol; halogenated hydrocarbons such as chloroform, dichloromethane and dichloroethane; diketones such as 2,4-pentanedione; ethers such as diethyl ether. From among these solvents, a good solvent for the particular polymer may suitably be selected for use in the process of the present invention.

Where a good solvent having better miscibility with water than the foregoing solvents is used, there can be obtained a porous membrane which is devoid of a nonporous layer (or skin layer) and hence exhibits high permeability to fluids, although pores extending in a direction perpendicular to the film surface are not necessarily formed on the side of the film contacted by steam.

Examples of such solvents having better miscibility with water include acetone, tetrahydrofuran, 1,4-dioxane, dimethyl sulfoxide, dimethylacetamide, dimethylformamide and N-methylpyrrolidone.

These good solvents may be used alone or in admixture of two or more. In addition, they may be used in combination with poor solvents for the polymer, provided that the solubilities of the good solvents are not substantially reduced.

The content of the polymer in the polymer solution affects the overall porosity, pore diameter distribution and other properties of the resulting porous membrane, and the optimum content varies with the types of polymer and solvent used. However, the content preferably ranges from about 2 to 40% by weight and more preferably from 5 to 30% by weight.

The term "film" as used herein means a layer of the above-defined polymer solution ranging in thickness from about 10 micrometers to several millimeters. Such a film can be formed by casting or spreading the above-defined polymer solution on a support body having a smooth surface, such as a rotary drum, endless belt, glass plate, metal plate or plastic film. So long as the smoothness of the resulting film is not impaired, porous support bodies such as porous plastic films may also be used for this purpose. Moreover, such a film can also be formed into hollow fibers by properly determining the content of the polymer in the polymer solution and spinning it through a nozzle for the formation of hollow fibers. Furthermore, if the polymer solution is allowed to flow down from a slit orifice, the film materials can be formed without using any support body.

Usually, the film so formed is immediately brought into contact with steam. However, the contact may be effected after a short lapse of time, so long as the good solvent has not evaporated to such an extent that a nonporous layer is formed in the surface of the finally obtained porous membrane.

In the process of the present invention, the resulting film of the polymer solution is made porous by forcibly contacting saturated steam or mist-containing steam with at least one surface of the film. Although the mist-containing steam may comprise unsatuaturated steam.

Any conventional device may be used to supply steam while controlling its temperature and concentration. Usually, saturated steam having a pressure of several atmospheres is ejected from a nozzle and supplied to the surface of the film.

The process for producing porous membranes with the aid of steam will hereinafter be referred to as the "steam coagulation process".

When the steam coagulation process of the present invention is compared with the wet process for producing porous membranes by use of a coagulation bath, the distinction between them is believed to lie in the fact that the poor solvent (water or steam) is supplied at different rates and, therefore, the polymer is coagulated at different rates. In the wet process involving a high coagulation rate, a nonporous layer is formed on the side of the film contacted by the poor solvent.

Although the mechanism by which a porous structure is created according to the steam coagulation process of the present invention has not been fully elucidated, one possible mechanism is as follows:

Where the good solvent used for the preparation of the polymer solution has a water-solubility equal to or lower than a predetermined level, the supply of steam to the surface of the film of the polymer solution produces, within the film, an aqueous phase containing a low proportion of the good solvent (hereinafter referred to as "the first phase") and a good solvent phase containing the polymer (hereinafter referred to as "the second phase"). The first phase forms islands, while the second phase forms a matrix. As the supply of steam (or water) proceeds, the first phase expands in the direction of the film thickness. Correspondingly, the good solvent present in the second phase gradually passes into the first phase. Thus, the reduced proportion of the good solvent in the second phase causes the polymer to precipitate and coagulate. Meanwhile, a part of the good solvent having passed into the first phase is eliminated from the system by flowing away together with the condensed water or by evaporation.

The above-described phase separation and the coagulation of the polymer proceed from the side of the film to which steam is supplied. Where the thickness of the film is small or the feed rate of steam is high, the coagulation of the polymer occurs almost simultaneously all over the film and, therefore, straight pores of substantially uniform size are formed throughout the whole thickness of the film. In contrast, where the thickness of the film is large or the feed rate of steam is low, the coagulation of the polymer proceeds slowly in the interior of the film and on the rear side thereof. During this period of time, the islands constituting the first phase unite with one another and increase in size to form large voids.

It will be understood that the coagulation rate of the polymer varies according to the type of the polymer, the dissolving power of the solvent for the polymer and other factors. Accordingly, the length and size of the straight pores can be controlled by changing the feed rate of steam and other factors with due consideration for the aforesaid factors.

On the other hand, where the good solvent for the polymer has good miscibility with water, the condensate (or water) of steam supplied to the surface of the film of the polymer solution reaches the rear surface in a short period of time. Accordingly, a single three-component system consisting of the polymer, the good solvent and water is initially formed within the film, although there may be a slight concentration gradient across the film. Then, as the supply of steam (or water) proceeds, a phase separation occurs to produce a phase (A) consisting of the polymer, a high proportion of the good solvent and a low proportion of water, and a phase (B) consisting of the polymer, a low proportion of the good solvent and a high proportion of water. As soon as the proportion of water in the phase (B) reaches a certain level, the polymer gradually precipitates and coagulates in the phase (B). Meanwhile, the continuing supply of steam gradually converts the phase (A) into the phase (B) and the coagulation of the polymer proceeds.

It is presumed that a porous structure is created in the above-described manner. However, water may have an appreciable concentration gradient across the film, although this depends on the thickness of the film and the feed rate of steam. Accordingly, the coagulation of the polymer would appear to proceed from the side of the film to which steam is supplied.

In the process of the present invention, there is used steam and/or mist that becomes water in the liquid state. This has been selected in consideration of such factors as handling properties, working environmental conditions, safety and economy. If these factors can be ignored, it is also possible to use the vapor and/or mist of any other liquid that serves as a poor solvent for the aforesaid polymer. Examples thereof include the vapor and/or mists of low-boiling liquids such as methyl alcohol, ethyl alcohol, acetone, methyl ethyl ketone, tetrahydrofuran and methyl acetate.

As used herein, the expression "forcibly contacting saturated steam or mist-containing steam with at least one surface of the film" does not mean that the film is simply placed in an atmosphere of steam or mist-containing steam, but that a predetermined amount of steam or mist-containing steam is supplied to the surface of the film in a predetermined period of time.

The coagulation rate and coagulation behavior of the polymer varies according to the type of the polymer, the concentration of the polymer solution, the thickness of the film, the boiling point of the good solvent, the miscibility of the good solvent and water and other factors. Accordingly, the pore diameter, pore diameter distribution, porosity and other parameters can be adjusted to any desired values by properly determining such steam supply conditions as temperature, concentration, feed rate and supply time.

Usually, as the temperature of steam becomes higher and the feed rate (in $mg/sec.cm^2$) of steam becomes higher, the resulting porous membrane tends to include straight pores having a larger length and a smaller pore diameter. Moreover, as the boiling point of the good solvent becomes lower, the resulting porous membrane tends to include straight pores having a smaller pore diameter.

No particular limitation is placed on the feed rate at which steam or mist containing steam is supplied to the surface of the film. However, steam or mist containing steam should preferably be supplied at a feed rate of about 0.1 to 1000 $mg/sec.cm^2$, more preferably about 0.5 to 100 $mg/sec.cm^2$ and most preferably about 1.0 to 50 $mg/sec.cm^2$. Steam or mist-containing steam should suitably be supplied for about 10 minutes or less.

No particular limitation is placed on the direction in which steam is supplied to the surface of the film. However, it is preferable from the viewpoint of supply efficiency to supply steam in a direction perpendicular to the surface of the film.

By the action of steam supplied to the surface of the film of the polymer solution, its polymeric constituent is coagulated to create a porous structure. In order to promote the coagulation of the polymer and prevent its redissolution, it is preferable to remove the good solvent from the film of the polymer solution or the resulting porous film during and/or after the supply of steam. The good solvent can be removed by evaporation or by allowing it to flow away in the form of a solution in the condensed water.

Where the good solvent remains in the interior of the porous film obtained after coagulation of the polymer, it can be removed, if necessary, by drying, washing with water, or other suitable means.

In the practice of the present invention, the film of the polymer solution may be formed on any of the above-described various support bodies having a smooth surface. However, if it is desired to form a continuous film of the polymer solution, it is preferable to use a moving support body such as a rotary drum, endless belt or similar device.

To this end, rotary drums and endless belts made of metal, resin, rubber, glass or the like can be used. However, it is preferable from the viewpoint of dimensional accuracy, durability, handling properties and other properties to use a rotary drum or endless belt made of stainless steel.

No particular limitation is placed on the size of the moving support body such as a rotary drum, endless belt or similar device, provided that it enables a film of the polymer solution to be formed and made porous on the surface thereof. Thus, its width, diameter, length and other dimensions may suitably be determined according to the production scale. It is preferable that the moving support body such as a rotary drum or endless belt has a smooth-finished surface and, moreover, be equipped with a device for controlling its surface temperature. As the surface temperature controlling device, the rotary drum may be equipped with a jacket, and the endless belt may be equipped with jacketed support rolls or infrared heaters.

The present process for producing porous membranes will hereinafter be described with reference to the embodiment involving the use of a moving support body. It is to be understood, however, that the process of the present invention is not limited thereto.

On the moving support body, a film of the polymer solution is formed by using any of various well-known means such as knife coaters and blade coaters. With due consideration for the concentration of the polymer solution and other factors, the thickness of the film of the polymer solution, which film is formed on the moving support body, should be determined so that the finally obtained porous membrane will have a thickness ranging from about 5 micrometers to several millimeters.

The film of the polymer solution formed on the moving support body is made porous by contacting saturated steam or mist-containing steam with the surface thereof.

The supply of steam may be carried out at any stage following the formation of the film of the polymer solution on the moving support body. For example, steam may be supplied immediately after the formation of the film, or after and/or during the removal of a part of the solvent from the film.

To this end, there may be used any method that enables steam to be substantially uniformly supplied to a predetermined area of the film on the moving support body. For example, the surface of the film may be directly exposed to steam ejected from a nozzle comprising a straight pipe having a plurality of holes made therein. Alternatively, a stream of steam having a predetermined width may be generated and directed to the surface of the film. Where the film has a large width, it is preferable to use a suitable steam supply device which enables steam to be supplied as uniformly as possible over the whole width of the film.

The film which has been made porous in the above-described manner is dried, for example, by exposure to a stream of air or by other suitable means, to remove a part or all of the solvent therefrom. Thereafter, the porous film is stripped from the moving support body. Where the solvent still remains in the stripped porous film, it may be removed, if necessary, by washing with water, drying or other suitable means. Thus, there is obtained a porous membrane in accordance with the present invention.

The process of the present invention makes it possible to produce porous membranes having, in at least one surface thereof, pores extending in a direction substantially perpendicular to the membrane surface (straight pores). These porous membrances are characterized in that the straight pores have a circular or elliptic cross-sectional shape, their ratio of major to minor axis is not greater than about 2.0, their average pore diameter is within the range of about 0.01 to 100 μm, their pore diameter distribution is narrow, the surface pore density at the membrane surface is within the range of about 20 to 80%, and the overall porosity of the membrane is within the range of about 20 to 90%.

The porous layer having straight pores formed therein will hereinafter be referred to as the straight-pore layer.

In the process of the present invention, various types of porous membranes can be produced by properly determining the processing conditions. They include, for example, homogeneous membranes consisting of a straight-pore layer alone; asymmetrical membranes consisting of a straight-pore layer and a void layer having larger pore diameters than those of straight pores; and heterogeneous membranes consisting of two straight-pore layers and a void layer disposed therebetween.

Although such porous membranes can be produced so as to have any desired thickness, their thickness usually ranges from 5 micrometers to several millimeters. Where the diameter of the straight pores is small, the thickness of the straight-pore layer should preferably be small from the viewpoint of permeability to fluids.

Moreover, if a suitably selected combination of polymer and good solvent is used, there can also be obtained porous membranes which, though having no straight pores, are devoid of a skin layer (or nonporous layer) and hence exhibit high permeability to fluids.

Some exemplary embodiments of the process of the present invention will be more specifically described with reference to the accompanying drawings.

Figure 1:
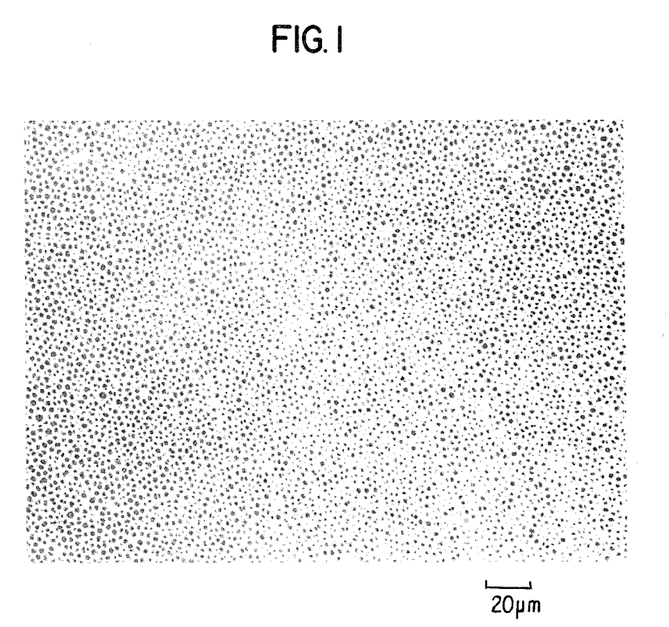
FIGS. 1, 2 and 3 are electron micrographs of the straight-pore layer surface, a cross section and the void layer surface, respectively, of the asymmetrical membrane obtained in Example 3.
Figure 2:
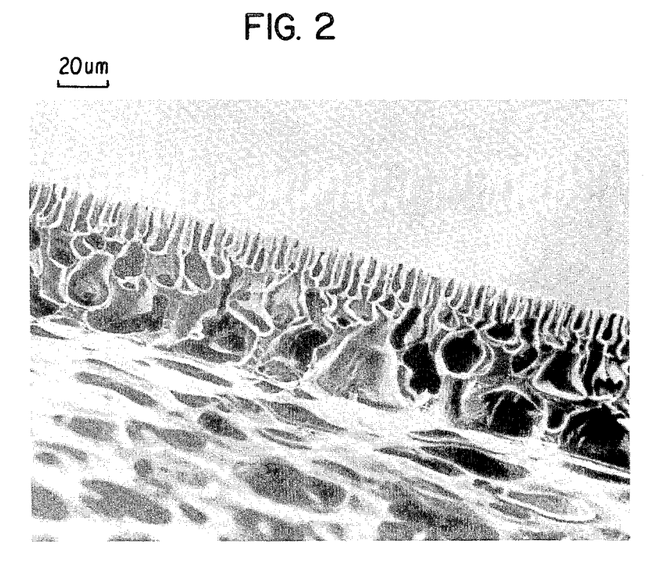
Figure 3:
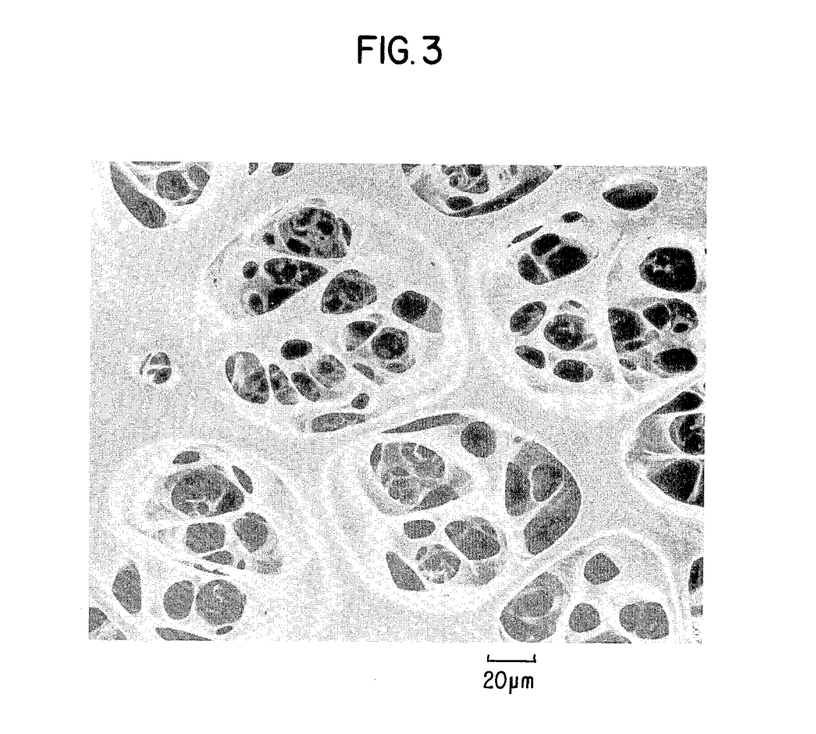
Figure 4:
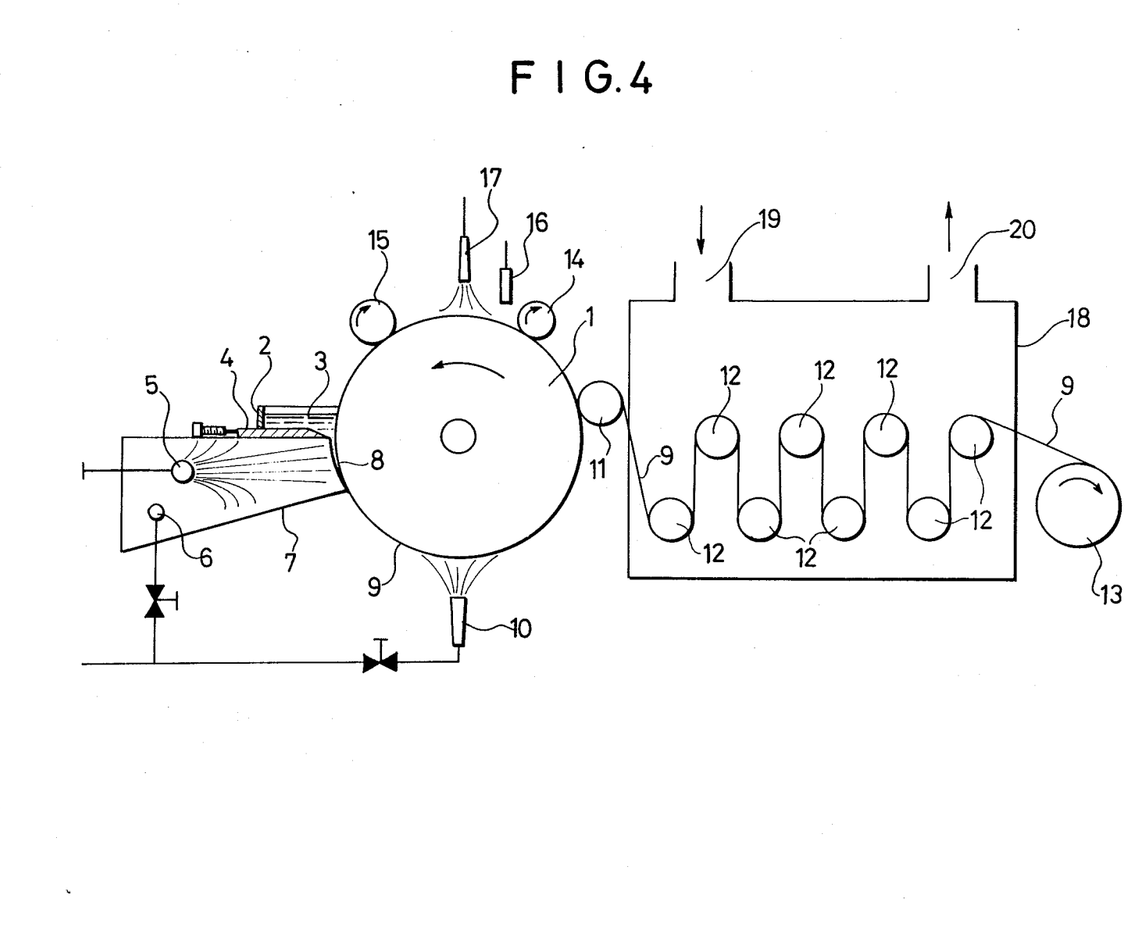
FIG. 4 is a schematic illustration of an apparatus suitable for carrying out the process of the present invention and equipped with a rotary drum.

FIG. 4 illustrates an apparatus suitable for carrying out the process of the present invention.

In the exemplary embodiment illustrated in FIG. 4, while a rotary drum 1 is being rotated, a polymer solution 3 placed in a reservoir 2 is continuously fed to the surface of the rotary drum. The rotary drum 1 is equipped with a temperature controlling jacket (not shown) and has a polished surface.

The thickness of the film of the polymer solution 3 formed on the surface of the rotary drum 1 is controlled by means of a knife coater 4. The resulting film of the polymer solution is made porous by supplying a steam to the surface of the film from a steam supply nozzle 5 having a plurality of openings. At the same time, an air supply nozzle 6 may be operated to eject air therefrom and supply it, together with steam, to the surface of the film.

As the film 9 which has been made porous travels with the rotary drum, the solvent is evaporated by exposure to air ejected from an air supply nozzle 10. Thereafter, the film is stripped from the rotary drum 1 by means of a roll 11, passed through a hot-air dryer 18 having a plurality of rolls 12 disposed therein, and then wound on a take-up roll 13.

In FIG. 4, 7 denotes an enclosure, 8 a film of a polymer solution, 14 and 15 wiping rolls, 16 a washing nozzle, 17 an air supply nozzle, 19 a hot air inlet and 20 a hot air outlet.

Figure 5:
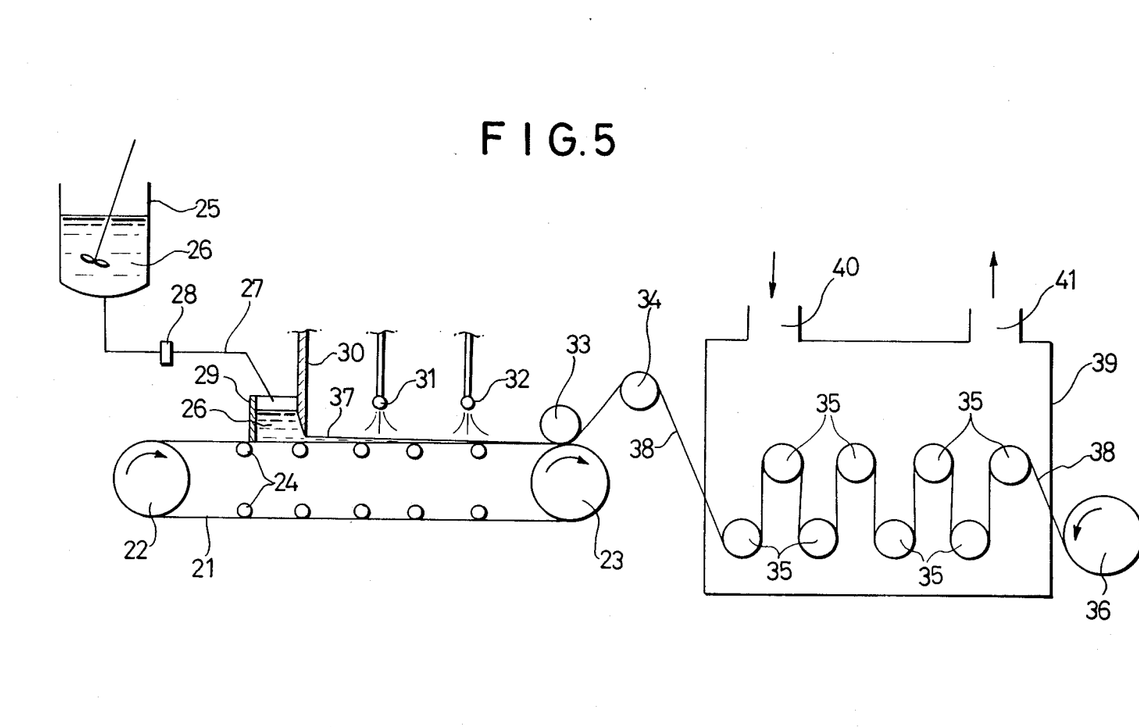
FIG. 5 is a schematic illustration of another apparatus suitable for carrying out the process of the present invention and equipped with an endless belt.

FIG. 5 illustrates another apparatus suitable for carrying out the process of the present invention.

In the exemplary embodiment illustrated in FIG. 5, while an endless belt 21 is being driven by driving pulleys 22 and 23, a polymer solution is continuously fed to its top surface. The endless belt 21 is supported by a plurality of temperature-controllable rolls 24 and has a mirror-polished surface. Using a gear pump 28, the polymer solution is transferred through a feed pipe 27 to a reservoir 20 of the polymer solution located above the top surface of the endless belt. The thickness of the film 37 of the polymer solution formed on the top surface of the endless belt 21 is controlled by means of a knife coater 30. Then, the film of the polymer solution formed on the top surface of the endless belt 21 is made porous by supplying a steam to the surface of the film from a steam supply nozzle 31 having a plurality of openings. Subsequently, the resulting porous film is exposed to air ejected from an air supply nozzle 32 so as to evaporate a part of the solvent present in the porous film. Thereafter, this porous film is stripped from the endless belt 21 by means of a roll 33, passed through a hot-air dryer 39 having a plurality of rolls 35 disposed therein, and then wound on a take-up roll 36 to obtain a porous membrane 38.

In FIG. 5, 25 denotes a storage tank, 26 a polymer solution, 34 a roll, 40 a hot air inlet and 41 a hot air outlet.

While the process of the present invention has been described with reference to some exemplary embodiments in which a porous membrane is continuously produced by using a moving support body, it can be carried out in both a batch-wise manner and a continuous manner.

The present invention is further illustrated by the following examples. In these examples, the average pore diameter and surface pore density of the straight-pore layer were determined with the aid of electron micrographs (at a magnification of 1000–5000 diameters) made by a scanning electron microscope, and the overall porosity of the membrane was measured with a mercury porosimeter.

Specifically, for each of the pores appearing in an electron micrograph of the straight-pore layer surface, its major and minor axes were measured and their mean value was taken to be the pore diameter of that pore. Then, the mean value of the pore diameters of 100 pores was taken to be the average pore diameter. The coefficient of variation of pore diameter was calculated from the measured pore diameters of 100 pores according to the following equation:

Coefficient of variation of pore diameter×(standard deviation/mean value)×100 (%)

Moreover, for each of 100 pores appearing in an electron micrograph (at a magnification of 1000–5000 diameters) of an arbitrary cross-section perpendicular to the membrane surfaces, the length (l) of the curved or straight line extending through the center of the pore and the thickness ($l_0$) of the straight-pore layer were measured. Then, the value of $l/l_0$ (hereinafter referred to as "tortuousity factor") was determined.

Air permeability (in $l/min\cdot cm^2$) was measured by establishing a differential pressure of 10 psi across the membrane.

In the comparative examples, air having a relative humidity of 5% was used.

In Examples 22 to 24, the filtering characteristics of the porous membranes were evaluated by using a polystyrene latex having a particle diameter of 0.109 μm (manufactured by Dow Chemical Co.).

EXAMPLE 1

60 parts of a copolymer consisting of tetrafluoroethylene and vinylidene fluoride in a molar ratio of 20:80 was dissolved in 40 parts of methyl methacrylate and the resulting solution was maintained in an atmosphere of nitrogen at 85° C. for 15 minutes to polymerize the methyl methacrylate. 100 parts of the polymer composition thus obtained was dissolved in 1900 parts of methyl ethyl ketone to prepare a polymer solution. Then, using a film casting applicator, this polymer solution was cast on a glass plate to a thickness of 254 82 m to form a film thereof.

Thereafter, by opening the valve of a pipeline containing saturated steam at a pressure of 3 kg/cm², saturated steam was supplied from a nozzle to the surface of the film for 20 seconds to coagulate the polymer. The amount of steam supplied through the pipeline was 267 g/min. Since the area of steam spreading region at a position 30 cm away from the nozzle was 177 cm², the feed rate of the steam was calculated to be 25 mg/sec.cm². When steam was supplied under the same conditions and its temperature was measured at a position 1 cm away from the film surface, it was found to be 83° C.

Thereafter, the coagulated polymer was exposed to a stream of air at 25° C. for 1 minute to remove the remaining solvent, and then stripped from the glass plate to obtain a porous membrane having an asymmetrical structure. Using a scanning electron microscope, the surfaces of this porous membrane and its cross-sections perpendicular to the surfaces were examined.

In the surface contacted by steam, elliptical minute pores having a uniform diameter and a ratio of major to minor axis of not greater than 2.0 were observed. On this side of the membrane, straight pores having a virtually unchanged diameter were observed in cross-sections perpendicular to the surface. In the area extending from the interior of the membrane to the other surface thereof, a void layer having pore diameters of 10 to 50 μm was observed.

The tortuosity factor of the straight pores was determined. For the pores present in the surface of the straight-pore layer, the ratio of major to minor axis, average pore diameter, coefficient of variation of pore diameter, and surface pore density were determined. In addition, the overall porosity of the porous membrane was determined. The results thus obtained are shown in Table 1.

EXAMPLES 2 AND 3

Porous membranes were made under the same conditions as described in Example 1, except that the feed rate of the steam was 17 mg/sec.cm² (Example 2) and 9.8 mg/sec.cm² (Example 3). The structural characteristics and other properties of these porous membranes were evaluated and the results of evaluation are shown in Table 1.

In both cases, there was obtained an asymmetrical membrane comprising a straight-pore layer and a void layer. The pore diameters of the void at the surface of the membrane ranged from about 10 to 100 μm.

When the temperature of steam was measured in the same manner as described in Example 1, it was found to be 56° C. (Example 2) and 44° C. (Example 3).

EXAMPLES 4 AND 5

Using a polymer solution composed of 100 parts of polymethyl methacrylate and 900 parts of methyl ethyl ketone, a film was formed in the same manner as described in Example 1.

Thereafter, porous membranes were made under the same conditions as described in Example 1, except that the feed rate of the steam was 10 mg/sec.cm² (Example 4) and 15 mg/sec.cm² (Example 5). The results of evaluation of these porous membranes are shown in Table 1.

EXAMPLE 6

A mixture of 60 parts of polyvinylidene fluoride, 60 parts of polymethyl methacrylate and 880 parts of methyl ethyl ketone was heated at 85° C. to prepare a polymer solution. Using this polymer, a film was formed in the same manner as described in Example 1.

Thereafter, a porous membrane was made under the same conditions as described in Example 1, except that the steam was supplied at a feed rate of 17.2 mg/sec.cm² for 2 minutes. The results of evaluation of this porous membrane are shown in Table 1.

COMPARATIVE EXAMPLE 1

The procedure of Example 1 was repeated except that the film was soaked in a water bath at 55° C. for 1 minute, instead of being brought into contact with steam. Thus, only a transparent nonporous film was obtained.

COMPARATIVE EXAMPLE 2

The procedure of Example 1 was repeated, except that the film was allowed to stand in air at 85° C. for 1 minute, instead of being brought into contact with steam. Thus, only a transparent non-porous film was obtained.

EXAMPLE 7

40 parts of a copolymer consisting of tetrafluoroethylene and vinylidene fluoride in a molar ratio of 20:80 was dissolved in 60 parts of methyl methacrylate and the resulting solution was maintained in an atmosphere of nitrogen at 85° C. for 15 minutes to polymerize the methyl methacrylate. 100 parts of the polymer composition thus obtained was dissolved in 1900 parts of methyl ethyl ketone to prepare a polymer solution. Then, a film was formed in the same manner as described in Example 1.

Thereafter, a porous membrane was made under the same conditions as described in Example 1, except that the steam was supplied to the surface of the film at a feed rate of 8 mg/sec.cm² for 4 minutes. When the temperature of steam was measured in the same manner as described in Example 1, it was found to be 45° C.

The structural characteristics and other properties of the porous membrane thus obtained were evaluated and the results of evaluation are shown in Table 1.

EXAMPLES 8 TO 11

Using the polymer composition obtained in Example 7, polymer solutions were prepared by dissolving it in methyl isobutyl ketone (Example 8), ethyl acetate (Example 9), methyl acetate (Example 10) and n-butyl acetate (Example 11). Thereafter, porous membranes were made under the same conditions as described in Example 7.

When the structure of each of these porous membranes was examined, all of them were found to be assymetrical membranes consisting of a straight-pore layer and a void layer.

The results of evaluation are shown in Table 1.

EXAMPLE 12

The polymer solution was prepared by dissolving, in 1430 parts of methyl ethyl ketone, 40 parts of a copolymer consisting of tetrafluoroethylene and vinylidene fluoride in a molar ratio of 20:80 and 60 parts of polymethyl methacrylate.

An apparatus as illustrated in FIG. 4 was used in this example. This apparatus included a rotary drum 1 made of stainless steel and having a diameter of 300 mm and a width of 300 mm. The drum was equipped with a temperature controlling jacket disposed therein, and its surface temperature was adjusted to 20° C. In the horizontal plane containing the shaft of the drum, a knife coater 4 was disposed above the drum surface, as illustrated in FIG. 4. While the drum was being rotated at a speed of 0.1 rpm, a polymer solution was continuously cast thereon to a thickness of 250 μm. A steam supply nozzle 5, which comprised a straight pipe of 12.5 mm inside diameter having a plurality of holes of 4 mm diameter at intervals of 25 mm, was disposed at a position 30 cm away from the drum surface. Saturated steam having a pressure of 3 kg/cm² was ejected from this nozzle and supplied to the surface of the film at a rate of 420 mg/sec over a surface area of about 300 cm².

Then, on the underside of the rotary drum, the resulting porous film 9 was predried by exposure to dry air ejected from an air supply nozzle 10. Further, on the side opposite the knife coater, a free roll 11 was brought into contact with the rotary drum to strip the porous film from the rotary drum.

Finally, the porous film was passed through a dryer 18 kept at 50° C. and then wound on a take-up roll 13.

The structural characteristics and other properties of the porous membrane thus obtained were evaluated and the results of evaluation are shown in Table 2.

EXAMPLE 13

A porous membrane was made under the same conditions as described in Example 12, except that the concentration of the polymer solution was 10% by weight, the rotational speed of the rotary drum was 0.3 rpm, and the feed rate of the steam was 2220 mg/sec. The results of evaluation of this porous membrane are shown in Table 2.

EXAMPLE 14

A porous membrane was made under the same conditions as described in Example 12, except that the concentration of the polymer solution was 6% by weight, and the feed rate of the steam was 1660 mg/sec. The results of evaluation of this porous membrane are shown in Table 2.

EXAMPLE 15

A porous membrane was made in the same manner as described in Example 12, except that the polymer solution was prepared by dissolving, in 950 parts of ethyl acetate, 50 parts of a copolymer consisting of acrylonitrile and styrene in a molar ratio of 1:1. The results of evaluation of this porous membrane are shown in Table 2.

EXAMPLE 16

An apparatus as illustrated in FIG. 5 was used in this example. This apparatus included an endless belt 21 made of stainless steel and having an overall length of 2 m and a width of 330 mm. While the belt was being driven at a speed of 25 cm/min by driving pulleys 22 and 23 having a diameter of 250 mm, the same polymer solution as used in Example 12 was continuously fed to the surface of the belt. Thus, a film 37 of the polymer solution having a thickness of 250 μm was formed. A steam supply nozzle 31, which comprised a straight pipe of 12.5 mm inside diameter having a plurality of holes of 4 mm diameter at intervals of 25 mm, was disposed at a position 15 cm above the belt surface. Saturated steam having a pressure of 3 kg/cm² was ejected from this nozzle and contacted with the film at a feed rate of 2.0 mg/sec.cm². Thus, the film was coagulated and made porous.

Then, the resulting porous film was exposed to air ejected from an air supply nozzle 32 so as to evaporate a part of the solvent present in the porous film. Thereafter, the porous film was stripped from the belt. Further, the porous film was dried in a hot-air dryer 39 kept at 60° C. and then wound on a takeup roll 36.

The structural characteristics and other properties of the porous membrane thus obtained were evaluated and the results of evaluation are shown in Table 2.

EXAMPLE 17

A porous membrane was made under the same conditions as described in Example 16, except that the feed rate of saturated steam was 5.0 mg/sec.cm². The results of evaluation of this porous membrane are shown in Table 2.

EXAMPLE 18

A porous membrane was made under the same conditions as described in Example 16, except that the feed rate of saturated steam was 15.0 mg/sec.cm². The results of evaluation of this porous membrane are shown in Table 2.

EXAMPLE 19

A porous membrane was made under the same conditions as described in Example 16, except that the steam supply nozzle 31 was disposed at a position 10 cm above the belt surface. The results of evaluation of this porous membrane are shown in Table 2.

EXAMPLE 20

A porous membrane was made under the same conditions as described in Example 16, except that the same polymer solution as used in Example 15 was used. The results of evaluation of this porous membrane are shown in Table 2.

EXAMPLE 21

A porous membrane was made under the same conditions as described in Example 1, except that a polymer solution prepared by dissolving 60 parts of the polymer composition of Example 1 in 940 parts of acetone was used and saturated steam was supplied at a feed rate of 17.2 mg/sec.cm$^2$ for 1 minute. This porous membrane had a sponge-like porous structure and exhibited the performance characteristics shown in Table 3.

EXAMPLE 22

A porous membrane was made under the same conditions as described in Example 21, except that a polymer solution prepared by dissolving 50 parts of the polymer composition in 950 parts of dimethylacetamide was used and saturated steam was supplied for 2 minutes. This porous membrane had a sponge-like porous structure and exhibited a polystyrene latex rejection of 90% or more. It exhibited the performance characteristics shown in Table 3.

EXAMPLE 23

A porous membrane was made under the same conditions as described in Example 22, except that a polymer solution prepared by dissolving 100 parts of polyvinylidene fluoride in 900 parts of dimethyl sulfoxide was used. This porous membrane had a sponge-like porous structure, exhibited an air permeability of 4.3 l/min.cm$^2$.10 psi, and rejected 90% or more of polystyrene latex particles having a diameter of 0.109 μm. Thus, this porous membrane exhibited a very high air permeability in spite of its high rejection of small-diameter particles. It exhibited the performance characteristics shown in Table 3.

EXAMPLE 24

A porous membrane was made under the same conditions as described in Example 23, except that a polymer solution prepared by dissolving 100 parts of polysulfone in 900 parts of N-methylpyrrolidone was used. On the side to which steam had been supplied, the surface layer of this porous membrane had a sponge-like porous structure similar to that of the porous membrane obtained in Example 23. However, the remaining part comprised a void layer of the finger type. It exhibited the performance characteristics shown in Table 3.

TABLE 1

| Example No. | Overall thickness (μm) | Thickness of straight-pore layer (μm) | Tortuosity factor | Surface of straight-pore layer | | | Surface pore density (%) | Pore diameters of void at the surface of void layer (μm) | Overall porosity (%) | Air permeability (1/min · cm$^2$) |
|---|---|---|---|---|---|---|---|---|---|---|
| | | | | Ratio of major to minor axis | Average pore diameter (μm) | Coefficient of variation of pore diameter (%) | | | | |
| Example 1 | 42 | 5 | 1.00–1.03 | 1.0–1.8 | 0.8 | 35 | 38 | 10–50 | 70 | — |
| Example 2 | 64 | 10 | 1.00–1.04 | 1.0–1.5 | 1.4 | 27 | 45 | 10–100 | 80 | — |
| Example 3 | 55 | 14 | 1.00–1.04 | 1.0–1.8 | 2.7 | 22 | 68 | 10–100 | 77 | — |
| Example 4 | 73 | 3 | 1.00–1.10 | 1.0–1.9 | 5.8 | 45 | 48 | 20–200 | 72 | — |
| Example 5 | 62 | 18 | 1.00–1.10 | 1.0–1.9 | 1.3 | 38 | 46 | 20–80 | 66 | — |
| Example 6 | 54 | 6 | 1.00–1.05 | 1.0–1.8 | 1.3 | 40 | 59 | 10–60 | 82 | — |
| Example 7 | 20 | 4 | 1.00–1.03 | 1.0–2.0 | 6.0 | 40 | 70 | 5–50 | 77 | 77.6 |
| Example 8 | 64 | 4 | 1.00–1.03 | 1.0–1.4 | 7.0 | 30 | 70 | 10–80 | 77 | 90.4 |
| Example 9 | 49 | 8 | 1.00–1.02 | 1.0–1.3 | 3.6 | 35 | 70 | 10–50 | 78 | 23.2 |
| Example 10 | 23 | 3 | 1.00–1.05 | 1.0–1.1 | 1.0 | 30 | 21 | 2–20 | 25 | 5.2 |
| Example 11 | 16 | 3 | 1.00–1.07 | 1.0–1.6 | 6.1 | 45 | 50 | 5–70 | 55 | 83.2 |

TABLE 2

| Example No. | Overall thickness (μm) | Thickness of straight-pore layer (μm) | Tortuosity factor | Surface of straight-pore layer | | | Surface pore density (%) | Overall porosity (%) |
|---|---|---|---|---|---|---|---|---|
| | | | | Ratio of major to minor axis | Average pore diameter (μm) | Coefficient of variation of pore diameter (%) | | |
| Example 12 | 54 | 2 | 1.00–1.05 | 1.0–1.8 | 8.0 | 39 | 65 | 74 |
| Example 13 | 82 | 6 | 1.00–1.04 | 1.0–1.9 | 3.5 | 35 | 48 | 70 |
| Example 14 | 55 | 8 | 1.00–1.05 | 1.0–1.6 | 2.2 | 33 | 57 | 72 |
| Example 15 | 46 | 3 | 1.00–1.08 | 1.0–1.9 | 3.2 | 46 | 50 | 63 |
| Example 16 | 66 | 1 | 1.00–1.05 | 1.0–2.0 | 10 | 38 | 72 | 91 |
| Example 17 | 62 | 4 | 1.00–1.05 | 1.0–1.8 | 3.0 | 29 | 67 | 83 |
| Example 18 | 55 | 9 | 1.00–1.05 | 1.0–1.7 | 0.8 | 22 | 65 | 76 |
| Example 19 | 58 | 4 | 1.00–1.05 | 1.0–1.8 | 0.8 | 25 | 64 | 77 |
| Example 20 | 47 | 10 | 1.00–1.10 | 1.0–2.0 | 2.6 | 50 | 25 | 40 |

TABLE 3

| Example No. | Overall thickness (μm) | Air flux (1/mon · cm$^2$ · 10 psi) | Bubble point (kg/cm$^2$) | Porous structure |
|---|---|---|---|---|
| Example 21 | 35 | 32 | 0.16 | Sponge type |
| Example 22 | 32 | 0.34 | 1.10 | Sponge type |

TABLE 3-continued

| Example No. | Overall thickness (μm) | Air flux (1/mon·cm²·10 psi) | Bubble point (kg/cm²) | Porous structure |
| --- | --- | --- | --- | --- |
| Example 23 | 18 | 4.3 | 0.96 | Sponge type (Front side) |
| Example 24 | 44 | 1.9 | 0.18 | Sponge type (Interior to rear side) Void layer of finger type |

In the process of the present invention, the use of a coagulation bath is not required and the amount of solvent to be recovered is small. Accordingly, when compared with the conventional wet coagulation process, the process of the present invention has the advantage of bringing about a marked reduction in production cost.

The process of the present invention makes it possible to produce porous membranes in which, in at least one surface thereof, pores having a narrow pore diameter distribution and a virtually unchanged pore diameter and extending in a direction substantially perpendicular to the membrane surface are present at high surface pore density. Porous membranes having this structure exhibit excellent fractionation characteristics and, therefore, can be used as filtering membranes having high permeability.

For example, porous membranes having surface pores with an average pore diameter of about 0.01 to 5 μm can be utilized as precision filtering membranes for the removal of impurities, the recovery of useful components, and like purposes in various fields including water treatment, food production and medical applications. On the other hand, porous membranes having an average pore diameter of about 5 to 100 μm can be utilized as filtering membranes for the removal of coarse particles or as substrates for composite membrane.

Moreover, the process of the present invention also makes it possible to produce porous membranes which, although having no straight pores, are devoid of a nonporous layer and hence exhibit high permeability to fluids. These porous membranes can also be utilized as precision filtering membranes.

What is claimed is:

1. A process for producing porous membranes having pores extending in a direction substantially perpendicular to the membrane surface at a high pore density on at least one surface thereof, consisting essentially of dissolving a film-forming polymer in a good solvent for said polymer, forming a film of the resulting polymer solution, and forcibly contacting saturated steam or mist-consisting saturated steam with at least one surface of said film to form pores extending in a direction substantially perpendicular to the membrane surface, wherein said good solvent has a water-solubility of not greater than 50 g per 100 g of water.

2. A process for producing porous membrane having pores extending in a direction substantially perpendicular to the membrane surface at a high pore density on one surface thereof, consisting essentially of dissolving a film-forming polymer in a good solvent for said polymer, forming a film of the resulting polymer solution on a moving support body, and forcibly contacting saturated steam or mist-containing saturated steam with the surface of said film to form pores extending in a direction substantially perpendicular to the membrane surface, wherein said good solvent has a water-solubility of not greater than 50 g per 100 g of water.

3. The process as claimed in claim 1 or 2 wherein said film-forming polymer is dissolved in the good solvent in the range of 2 to 40% by weight.

4. The process as claimed in claim 1 or 2 wherein said saturated steam or mist-containing saturated steam is supplied at a feed rate of 0.1 to 1000 mg/sec per 1 cm² of said film.

* * * * *

UNITED STATES PATENT AND TRADEMARK OFFICE
CERTIFICATE OF CORRECTION

PATENT NO. : 4,869,857
DATED : Sep. 26, 1989
INVENTOR(S) : Hajime Itoh, et al

It is certified that error appears in the above-identified patent and that said Letters Patent is hereby corrected as shown below:

Title page:

The Assignee is incorrectly recorded, "Itsubishi Rayon Co., Ltd., Tokyo, Japan" should be:

--Mitsubishi Rayon Co., Ltd., Tokyo, Japan--

Signed and Sealed this

Sixteenth Day of October, 1990

Attest:

HARRY F. MANBECK, JR.

*Attesting Officer*  *Commissioner of Patents and Trademarks*